US006528127B1

(12) United States Patent
Edlein et al.

(10) Patent No.: US 6,528,127 B1
(45) Date of Patent: *Mar. 4, 2003

(54) METHOD OF PROVIDING A PRINTED THERMOPLASTIC FILM HAVING A RADIATION-CURED OVERPRINT COATING

(75) Inventors: Marc A. Edlein, Seneca, SC (US); David Ray Kyle, Moore, SC (US)

(73) Assignee: Cryovac, Inc., Duncan, SC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/264,074

(22) Filed: Mar. 8, 1999

(51) Int. Cl.[7] .............................. C08J 7/18; C08J 7/04; B05D 3/02; B05D 3/06

(52) U.S. Cl. ....................... 427/494; 427/508; 427/496; 427/500; 427/511; 427/504; 427/393.5

(58) Field of Search ................................ 428/195, 201, 428/203, 204, 908.8, 909, 911; 427/494, 500, 504, 507, 510, 511, 514, 520, 496, 508, 385.5, 393.5

(56) References Cited

U.S. PATENT DOCUMENTS 3,850,675 A 11/1974 Miller
3,936,557 A 2/1976 Watt
3,978,260 A * 8/1976 Dobbins et al. ............ 428/204
4,064,296 A 12/1977 Bornstein et al. ............ 428/35
4,070,497 A 1/1978 Wismer et al. ............... 427/44
4,120,716 A 10/1978 Bonet ......................... 156/272
4,157,947 A * 6/1979 Borden et al. .............. 427/500
4,197,344 A 4/1980 Tshudy
4,246,297 A * 1/1981 Nablo et al.
4,309,452 A 1/1982 Sachs
4,358,476 A * 11/1982 Zimmer et al. ............. 427/494
4,410,560 A 10/1983 Kosterka ..................... 427/44
4,439,480 A 3/1984 Sachs et al. ................ 428/161
4,647,475 A 3/1987 Inukai et al. ................. 427/44
4,675,234 A * 6/1987 Sachs et al. ................ 427/507
H304 H 7/1987 Vorrier et al.
4,842,906 A 6/1989 Ekdahl et al. ............. 428/34.2
4,879,430 A 11/1989 Hoffman .................... 428/35.1
4,935,288 A 6/1990 Honaker et al. ............ 428/207
5,019,202 A 5/1991 Kawahata et al.
5,070,121 A * 12/1991 Hinterwaldner et al. ...... 524/31
5,084,344 A 1/1992 Harada et al. .............. 428/334
5,296,340 A * 3/1994 Tsukada et al. ............. 427/504
5,330,799 A 7/1994 Sandor et al.
5,379,697 A 1/1995 Ertl
5,407,708 A 4/1995 Lovin et al. ................ 427/493
RE35,203 E 4/1996 Wakalopulos
5,562,951 A 10/1996 Kamen ....................... 427/493
5,645,639 A 7/1997 Doesburg et al.
5,656,701 A * 8/1997 Miyamoto et al. .......... 525/453
5,744,248 A 4/1998 Meixner et al.
5,763,048 A * 6/1998 Takahashi ................... 428/147
5,945,183 A 8/1999 Johnson

FOREIGN PATENT DOCUMENTS

EP 0 089 629 A3 9/1983
EP 0 544 052 B1 6/1993
EP 0 737 593 A2 10/1996
GB 2 284 787 A 6/1995
JP 57-059968 4/1982
JP 57/157785 9/1982
JP 9-302264 11/1997
WO WO 98/51437 11/1998

OTHER PUBLICATIONS

Fred McIntyre, "The Practical Implications of EB Hybrids", pp. 76–78, Feb. 1996. *Converting Magazine.*

McIntyre, "UV–Cured Durable Top Coats: A Replacement for OPP & PET Film Laminations," Presented at Future–Pak 1997, Oct. 28–29, 1997 (together with MCTC–2138 & 2139 Data Sheets).

Davis et al, "Chemistry Considerations for Low–Voltage EB Applications," RadTech Report, pp. 18–20, Sep./Oct. 1996.

Dionne, "Can the energy–curing industry cash in on food–packaging opportunities!" Converting Magazine's Flex–Pack Management, , vol. 4, No. 1, pp. 2–3 (Jan. 1, 1998).

Dionne, "UV/EB Curing stakes a claim on flexo–printed food packaging" Converting Magazine's Flex–Pack Management, p. 3 (Feb. 1, 1998).

Wakalopulos, "Low Voltage or Ultra Low Voltage? . . . " Radtech Report, pp. 10–15 (Jul./Aug. 1998).

Morton Adhesives, Mor–Quik® 477 Coating Data Sheets (Feb. 22, 1998).

Morton Adhesives, Mor–Quik® 333 Coating Data Sheets (Sep. 2, 1998).

Morton International, Mor–Quik 477 Material Safety Data Sheet, pp. 1–6 (Jan. 29, 1999).

Northwest Coatings Corp., "Adhesives and Coatings that Exceed our Customers' Expectations," Product Brochures and Product Sheets. No date.

Fletcher, "New Lower–Voltage EB Systems for Curing Polymers and Coatings," Journal of Coatings Technology, vol. 65, No. 822, pp. 61–63 (Jul. 1993).

Burkart, "Product Trend Report: UV Inks and Curing," Flexo, pp. 46–49 (Sep. 1997).

(List continued on next page.)

*Primary Examiner*—Marianne Padgett
(74) *Attorney, Agent, or Firm*—Daniel B. Ruble

(57) ABSTRACT

A printed packaging material and a method for making the same is described. On a primary surface of a thermoplastic flexible packaging material is disposed a printed image. That image includes two primary components. The first is at least one marking containing a pigment. The second is a pigment-free coating which overlies the outermost marking. The coating is made from materials which can polymerize and/or crosslink when exposed to ionizing radiation. After the film is exposed to such radiation, the coating hardens to form a protective layer over the printed markings.

38 Claims, No Drawings

OTHER PUBLICATIONS

Ravijst, "Radiation Cure Applications in the Packaging Industry," Packaging India, pp. 107–109 (Dec. '97).

Guarino, "A Review of Properties and Uses of Radiation Curing for the Near Term and Future," 1990 Polymers, Laminations & Coatings, pp. 891–893 (TAPPI Proceedings 1990). No month.

Pierce & Stevens Corp., Miracure EB Curable Coatings, Product Brochure, "Formulated for Success: Coatings & Adhesives for Packaging and Graphic Arts" (Nov. 1998).

Leach et al, The Printing Ink Manual, Chapter 11, pp. 636–677 (Fifth Ed., Kluwer Academic Publishers 1993). No month.

Clinkunbroomer, "Though the Future is Bright for UV Inks, Wide Web Flexo Market Remains Elusive, " American Ink Maker, pp. 23–26 (Sep. 1998).

Mcintyre, "'Total Package Concept:' Electron Beam Technology for Barrier, Adhesive, and Overcoat Applications," Presented at Future–Pak '95 (20 pages) (Sep. 13–15, 1995).

Harris, "UV Coating—beyond stick and shine," FlexoTech, pp. 21–22 (Jun. 1998).

Wild et al., J. Poly. Sci.—Poly. Phys. Ed., vol. 20,441 (1982) No month.

LeRoy Pike, "Optical properties of Packaging Materials," *Journal of Plastic Film & Sheeting*, vol. 9, No. 3, pp. 173–180 (Jul. 1993).

1990 Annual Book of ASTM Standards, Section 8, vol. 08.01, ASTM D 1003, "Standard Test Method for Haze Luminous Transmittance of Transparent Plastics", pp. 358–363. No month.

* cited by examiner

METHOD OF PROVIDING A PRINTED THERMOPLASTIC FILM HAVING A RADIATION-CURED OVERPRINT COATING

BACKGROUND INFORMATION

1. Field of the Invention

The present invention relates to the printing of thermoplastic packaging materials, particularly to printing techniques involving the use of radiation curable coatings used to protect underlying layers of printed markings.

2. Background of the Invention

Although printing techniques have become quite specialized and well-defined over the years, the printing of thermoplastic packaging films has remained a bit of a black art. Not until recently have packagers required film manufacturers to provide packaging films bearing photograph quality printed images. This is a significant challenge by itself, but the uses to which some packagers put those films often make a difficult situation even worse.

Packaging applications that require heat shrinkable films present especially challenging problems to film manufacturers. This is due to the need for the printing ink(s) to exhibit sufficient flexibility so as not to crack or flake off once the film has undergone heat shrinking. Those heat shrink applications involving significant amounts of heat, friction, and/or film-to-metal contact magnify the problem all the more. Films intended for cook-in applications can undergo all of these strenuous conditions and provide film manufacturers and converters with some of their greatest printing challenges.

To prevent cracking and/or flaking of printed images, film manufacturers have developed several strategies. Most often, these involve the use of new ink formulations. Standard inks used in the printing of thermoplastic films involve pigments carried in a resin (e.g., nitrocellulose, polyamide, etc.) which is soluble in a carrier solvent (e.g., an alcohol). Once the ink is applied to the film, the solvent evaporates, leaving behind the resin-pigment combination. Newer, more exotic formulations have involved two-part polyurethane resin systems as well as solvent-free systems in which the resin(s) can be cured by means of ultraviolet (UV) light. These new approaches are not without drawbacks, however, due primarily to concerns regarding operator exposure (due to the components causing short term effects such as nausea, headaches, nosebleeds, etc.) and the need to assure that the components have crosslinked to a degree sufficient to ensure that the system complies with applicable governmental food safety regulations. The components used in the two-part system of the former often are not approved for use with food packaging films while the latter requires the presence of photoinitiators which migrate into the packaged product. Both of these are unacceptable to the conscientious film manufacturer.

That which the art has not taught and which remains desirable is a printing technique which allows the use of standard ink formulations but which avoids the cracking and/or flaking problems which those types of ink have exhibited under the strenuous conditions presented by heat shrink applications.

SUMMARY OF THE INVENTION

Briefly, the present invention provides a printed thermoplastic flexible packaging material which includes a coating of a material that protects the printed image. The packaging material includes at least two primary surfaces. On at least one of those surfaces, a printed image is applied. The image includes at least one pigment-containing marking derived from a solvent-based ink and a pigment-free coating overlying the outermost pigment-containing marking. The coating includes one or more polymerizable materials, each of which can be cured by ionizing radiation. When the printed packaging material is exposed to ionizing radiation, the coating hardens to form a protective layer over the pigment-containing markings of the printed image.

In another aspect, the present invention provides a method of printing a packaging material. That method involves (a) applying one or more solvent-based inks to a thermoplastic flexible packaging material and allowing or causing the applied ink(s) to become affixed to the packaging material so as to create a pigment-containing marking on the packaging material; (b) applying to the marked packaging material, in a manner which substantially completely covers all of the pigment-containing markings, a pigment-free coating which includes one or more polymerizable materials; and (c) exposing the marked packaging material to ionizing radiation so as to polymerize and, optionally, crosslink the one or more polymerizable materials in the pigment-free coating. Where more than one ink is applied to the packaging material, each ink preferably is applied only after the previous one(s) have become sufficiently affixed to the packaging material that smearing and smudging are avoided.

The method of the present invention provides a distinct and significant advantage over previously described printing methods in that allows for the use of standard solvent-based inks, even where the end use of the printed film involves significant physical and/or chemical abuse. By employing an extremely tough coating over such inks, those inks are protected even through severe handling and processing conditions. This avoids the need for exotic ink systems and/or a tempering of the handling and processing conditions.

The following definitions apply herein throughout unless a contrary intention is expressly indicated:

- "comprising" means including at least, but not limited to, the named materials (in relation to an article or composition), parts (in relation to a machine), or steps (in relation to a method);
- "disposed on," with respect to the location of an ink in relation to the surface layer of the printed film, means coated on or applied to such that it is in intimate contact with a primary surface of the film;
- "flexible" means capable of deformation without catastrophic failure;
- "package" means one or more packaging materials (e.g., a film) configured around a product;
- "polymer" means the polymerization product of one or more monomers and is inclusive of homopolymers, copolymers, and interpolymers as well as blends and modifications thereof;
- "mer unit" means that portion of a polymer derived from a single reactant molecule; for example, a mer unit from ethylene has the general formula —$CH_2CH_2$—;
- "homopolymer" means a polymer consisting essentially of a single type of repeating mer unit;
- "copolymer" means a polymer that includes mer units derived from two reactants (normally monomers) and is inclusive of random, block, segmented, graft, etc., copolymers;
- "interpolymer" means a polymer that includes mer units derived from at least two reactants (normally monomers) and is inclusive of copolymers, terpolymers, tetrapolymers, and the like;

"polyolefin" means a polymer in which some mer units are derived from an olefinic monomer which can be linear, branched, cyclic, aliphatic, aromatic, substituted, or unsubstituted (e.g., olefin homopolymers, interpolymers of two or more olefins, copolymers of an olefin and a non-olefinic comonomer such as a vinyl monomer, and the like);

"(meth)acrylic acid" means acrylic acid and/or methacrylic acid;

"(meth)acrylate" means an ester of (meth)acrylic acid;

"anhydride-grafted" means a group containing an anhydride moiety, such as that derived from maleic acid, fumaric acid, etc., has been chemically attached to or affiliated with a given polymer;

"permeance" (in the packaging industry, "permeance" often is referred to as "transmission rate") means the volume of a gas (e.g., $O_2$) that passes through a given cross section of film (or layer of a film) at a particular temperature and relative humidity when measured according to a standard test such as, for example, ASTM D 1434 or D 3985;

"curable" means capable of polymerization and/or crosslinking;

"photoinitiator" means a substance which, when exposed to specific wavelengths (e.g., polymerization) or actinic radiation, forms a reactive species that initiates a reaction in one or more other substances in its vicinity;

"solvent-based ink" means an ink in which a pigment is dispersed in a polymeric carrier which, in turn, is solvated in a liquid medium such as, for example, water, an alcohol, an ester, or the like;

"corona treatment" or "corona discharge treatment" means a process in which one or both primary surfaces of a thermoplastic film are subjected to the ionization product of a gas (e.g., air) in close proximity with the film surface(s) so as to cause oxidation and/or other changes to the film surface(s);

"cook" means to heat a food product thereby effecting a change in one or more of the physical or chemical properties thereof (e.g., color, texture, taste, and the like)

"longitudinal direction" means that direction along the length of a film, i.e., in the direction of the film as it is formed during extrusion and/or coating;

"transverse direction" means that direction across the film and perpendicular to the machine direction;

"free shrink" means the percent dimensional change, as measured by ASTM D 2732 (incorporated herein by reference), in a 10 cm×10 cm specimen of film when subjected to heat;

"shrink tension" means the force per average cross-sectional area developed in a film, in a specified direction and at a specified elevated temperature, as the film attempts to shrink at that temperature while being restrained (measured in accordance with ASTM D 2838, which is incorporated herein by reference);

as a verb, "laminate" means to affix or adhere (by means of, for example, adhesive bonding, pressure bonding, corona lamination, and the like) two or more separately made film articles to one another so as to form a multilayer structure; as a noun, "laminate" means a product produced by the affixing or adhering just described;

"directly adhered," as applied to film layers, means adhesion of the subject film layer to the object film layer, without a tie layer, adhesive, or other layer therebetween.

"between," as applied to film layers, means that the subject layer is disposed in the midst of two object layers, regardless of whether the subject layer is directly adhered to the object layers or whether the subject layer is separated from the object layers by one or more additional layers;

"inner layer" or "internal layer" means a layer of a film having each of its principal surfaces directly adhered to one other layer of the film;

"outer layer" means a layer of a film having less than both of its principal surfaces directly adhered to other layers of the film;

"inside layer" means the outer layer of a film in which a product is packaged that is closest, relative to the other layers of the film, to the packaged product;

"outside layer" or "surface layer" means the outer layer of a film in which a product is packaged that is farthest, relative to the other layers of the film, from the packaged product;

"barrier layer" means a film layer capable of excluding one or more gases (e.g., $O_2$);

"abuse layer" means an outer layer and/or an inner layer that resists abrasion, puncture, and other potential causes of reduction of package integrity and/or appearance quality;

"tie layer" means an inner layer having the primary purpose of providing interlayer adhesion to adjacent layers that include otherwise non-adhering polymers; and "bulk layer" means any layer which has the purpose of increasing the abuse resistance, toughness, modulus, etc., of a multilayer film and generally comprises polymers that are inexpensive relative to other polymers in the film which provide some specific purpose unrelated to abuse resistance, modulus, etc.

DETAILED DESCRIPTION OF ILLUSTRATIVE EMBODIMENTS

Thermoplastic flexible packaging films find wide use throughout industry and come in a variety of forms and end-use characteristics. Whether the film contains one layer or more than one layer is unimportant as long as the film remains satisfactory for the particular end use application for which it is intended.

Such films often contain at least one layer which includes a polymer including mer units derived from ethylene. Although some ethylene homopolymers are used, interpolymers often are preferred. Exemplary interpolymers include those that include mer units derived from one or more of $C_3$–$C_{20}$ α-olefins, vinyl acetate, (meth)acrylic acid, and $C_1$–$C_{20}$ esters of (meth)acrylic acid. lonomers also can be useful. Preferred interpolymers are ethylene/α-olefin copolymers.

The relatively recent advent of single site-type catalysts (e.g., metallocenes) necessitates further definitional clarification when discussing ethylene homo- and copolymers. Heterogeneous polymers are those having relatively wide variation in molecular weight and composition distribution. Polymers prepared with, for example, conventional Ziegler Natta catalysts are heterogeneous. Such polymers can be used in the outside layer of the film, as well as a number of other layers of the film where it has multiple layers.

On the other hand, homogeneous polymers have relatively narrow molecular weight and composition distribution. Homogeneous polymers differ structurally from heterogeneous polymers in that they exhibit a relatively even sequencing of comonomers within a chain, a mirroring of sequence distribution in all chains, and a similarity of chain lengths, i.e., a narrower molecular weight distribution. Homogeneous polymers typically are prepared using metallocene or other single site-type catalysts. Homogeneous polymers also can be used in the printed film of the present invention.

The term "ethylene/α-olefin interpolymer" as used herein refers both to heterogeneous materials such as low density polyethylene (LDPE), medium density polyethylene (MDPE), linear low density polyethylene (LLDPE), and very low and ultra low density polyethylene (VLDPE and ULDPE), as well as to homogeneous materials which, in general, are prepared by the copolymerization of ethylene and one or more α-olefins. Preferably, the comonomer(s) is/are one or more $C_4$–$C_{20}$ α-olefins, more preferably one or more $C_4$–$C_{12}$ α-olefins, and most preferably one or more $C_4$–$C_8$ α-olefins. Particularly referred α-olefins include 1-butene, 1-hexene, 1-octene, and mixtures thereof. In general, from about 80 to 99 weight percent ethylene and from 1 to 20 weight percent α-olefin, preferably from about 85 to 95 weight percent ethylene and from 5 to 15 weight percent α-olefin, are copolymerized in the presence of a single site catalyst. Examples of commercially available homogeneous materials include the metallocene catalyzed Exact™ resins (Exxon Chemical Co.; Baytown, Tex.), substantially linear Affinity™ and Engage™ resins (Dow Chemical Co.; Midland, Mich.), and Tafmer™ linear resins (Mitsui Petrochemical Corp.; Japan).

Homogeneous ethylene/α-olefin interpolymers can be characterized by one or more methods known to those of skill in the art, such as molecular weight distribution ($M_w$/$M_n$), composition distribution breadth index (CDBI), narrow melting point range, and single melt point behavior. The molecular weight distribution, also known as polydispersity, can be determined by, for example, gel permeation chromatography. Homogeneous ethylene/α-olefin copolymers to be used in a layer of the film of the present invention preferably have an $M_w/M_n$ of less than 2.7; more preferably from about 1.9 to 2.5; still more preferably, from about 1.9 to 2.3.

The CDBI of homogeneous ethylene/a-olefin interpolymers generally is greater than about 70 percent. CDBI is defined as the weight percent of polymer molecules having a comonomer content within 50% (i.e., ±50%) of the median total molar comonomer content. CDBI can be determined by temperature rising elution fractionation as described by, for example, Wild et. al., *J. Poly. Sci.—Poly. Phys. Ed.,* vol. 20, 441 (1982). Linear polyethylene, which does not contain a comonomer, is defined to have a CDBI of 100%. CDBI determination clearly distinguishes homogeneous copolymers (CDBI values generally above 70%) from presently available VLDPEs (CDBI values generally less than 55%).

Homogeneous ethylene/α-olefin interpolymers also typically exhibit an essentially single melting point with a peak melting point ($T_m$), as determined by differential scanning calorimetry (DSC), of from about 60° to 105° C., more precisely a DSC peak $T_m$ of from about 80° to 100° C. As used herein, the phrase "essentially single melting point" means that at least about 80% (by weight) of the material corresponds to a single $T_m$ at a temperature within the range of from about 60° C. to 105° C., and essentially no substantial fraction of the material has a peak melting point in excess of about 115° C. as determined by DSC analysis (e.g., on a Perkin Elmer™ System 7 Thermal Analysis System). The presence of higher melting peaks has been found to be detrimental to film properties such as haze and seal initiation temperature.

Regardless of the type of polymer(s) containing mer units derived from ethylene which is/are used in the outside layer, other layers can be present in the film. For example, the film can include a layer having a low permeance to oxygen, preferably an oxygen permeance at about 23° C. and 0% relative humidity of no more than about 150 $cm^3/m^2 \cdot atm \cdot 24$ hours, more preferably no more than about 100 $cm^3/m^2 \cdot atm \cdot 24$ hours, even more preferably no more than about 50 $cm^3/m^2 \cdot atm \cdot 24$ hours, and most preferably no more than about 20 $cm^3/m^2 \cdot atm \cdot 24$ hours. Such an $O_2$-barrier layer preferably has a thickness of from about 0.001 to about 0.05 mm, more preferably from about 0.002 to about 0.0075 mm, and most preferably from about 0.0025 to about 0.005 mm. Such an $O_2$-barrier layer can include one or more of EVOH, PVDC, polyalkylene carbonate, polyamide, and polyester. Preferably, any $O_2$-barrier layer is an inner layer of a film used according to the present invention.

Where the film includes two or more layers, one or more tie layers can be used to provide increased adherence between the other layers. Such layers often have a relatively high degree of compatibility with polymers used in $O_2$-barrier layers (e.g., EVOH or polyamide) as well as with polymers used in other, non-barrier layers (e.g., polyolefins). When such a tie layer is present, it preferably is disposed on one or both primary sides of the $O_2$-barrier layer, more preferably directly adhered to one or both primary sides of the $O_2$-barrier layer. Such tie layers can include one or more polymers that contain mer units derived from at least one of $C_2$–$C_{12}$ α-olefin, styrene, amide, ester, and urethane, preferably one or more of anhydride-grafted ethylene/α-olefin interpolymer, anhydride-grafted ethylene/ethylenically unsaturated ester interpolymer, and anhydride-grafted ethylene/ethylenically unsaturated acid interpolymer.

The film also can include one or more other layers which can serve as inner or outer layers and can be classified as bulk layers, abuse layers, etc. Such a layer can include one or more polymers that include mer units derived from at least one of a $C_2$–$C_{12}$ α-olefin, styrene, amides, esters, and urethanes. Preferred among these are those homo- and interpolymers that include mer units derived from ethylene, propylene, and 1-butene, even more preferably an ethylene interpolymer such as, for example, ethylene/$C_3$–$C_8$ α-olefin interpolymer, ethylene/ethylenically unsaturated ester interpolymer (e.g., ethylene/butyl acrylate copolymer), ethylene/ethylenically unsaturated acid interpolymer (e.g., ethylene/(meth)acrylic acid copolymer), and ethylene/vinyl acetate interpolymer. Preferred ethylene/vinyl acetate interpolymers are those that include from about 2.5 to about 27.5% (by wt.), preferably from about 5 to about 20% (by wt.), even more preferably from about 5 to about 17.5% (by wt.) mer units derived from vinyl acetate. Such a polymer preferably has a melt index of from about 0.3 to about 25, more preferably from about 0.5 to about 15, still more preferably from about 0.7 to about 5, and most preferably from about 1 to about 3.

The film can include a layer derived at least in part from a polyester and/or a polyamide. Examples of suitable polyesters include amorphous (co)polyesters, poly(ethylene/terephthalic acid), and poly(ethylene/naphthalate), although poly(ethylene/terephthalic acid) with at least about 75 mole percent, more preferably at least about 80 mole percent, of its mer units derived from terephthalic acid can be preferred for certain applications. Examples of suitable polyamides include polyamide 6, polyamide 9, polyamide 10, polyamide 11, polyamide 12, polyamide 66, polyamide 610, polyamide 612, polyamide 61, polyamide 6T, polyamide 69, interpolymers made from any of the monomers used to make two or more of the foregoing homopolymers, and blends of any of the foregoing homo- and/or interpolymers.

Preferably, a film used according to the present invention includes from 2 to 20 layers; more preferably, from 2 to 12 layers; more preferably, from 2 to 9 layers; more preferably, from 3 to 8 layers.

Various combinations of layers can be used in the formation of multilayer films. Only 2- through 9-layer embodiments are provided here for illustrative purposes; however, a film according to the present invention can include more layers. Given below are some examples of preferred combinations in which letters are used to represent film layers:

A/B, A/B/A, A/B/C, A/B/D, A/B/C/A, A/B/C/D, A/C/B/C/A, A/B/C/D/A, A/D/B/A, A/B/C/D/C', A/B/D/C, A/B/D/C/D, A/C/B/D, A/D/C/D, A/B/D/C/C', D/C/D/C/D/C/A, D/C/D/C/A, D/C/A/C/D/B/D/C/A, A/C/D/B/D/C/A wherein A represents a layer that includes a polymer including mer units derived from ethylene (as described supra);

B represents a layer including a polymer having a low permeance to oxygen (as described supra);

C and C' represent layers including one or more polymers that include mer units derived from at least one of a $C_2$–$C_{12}$ α-olefin, styrene, amide, ester, and urethane; and D represents a layer including a polyester or polyamide. Of course, one or more tie layers can be used in any of the above structures.

As described previously, the film of the present invention is printed on one of its primary surfaces, preferably on it outside layer. That outside layer preferably includes one or more of a poly($C_2$–$C_{12}$ α-olefin), a polyamide, a polyester, poly(vinylidene chloride), and ethylene/vinyl alcohol copolymer.

Regardless of the number and order of layers, one or more conventional packaging film additives can be included therein. Examples of additives that can be incorporated include, but are not limited to, antiblocking agents, antifogging agents, slip agents, colorants, flavorants, antimicrobial agents, meat preservatives, and the like. (The ordinarily skilled artisan is aware of numerous examples of each of the foregoing.) Where the film is to processed at high speeds, inclusion of one or more antiblocking agents in and/or on one or both outer layers of the film structure can be preferred. Examples of useful antiblocking agents for certain applications are corn starch and ceramic microspheres.

A film used according to the present invention preferably exhibits a sufficient Young's modulus (measured in accordance with ASTM D 882, the teaching of which is incorporated herein by reference) so as to withstand normal handling and use conditions. Typically, a film used according to the present invention exhibits a Young's modulus in the range of from about 70 to about 1000 MPa. It preferably exhibits a Young's modulus of at least about 200 MPa, more preferably at least about 300 MPa, and most preferably at least about 400 MPa.

Where a film is intended for end use applications involving heat shrinking, it preferably exhibits a shrink tension in at least one direction of at least about 0.33 MPa, more preferably at least about 0.67 MPa, up to about 3.5 MPa, more preferably up to about 3 MPa. In such instances, the film preferably is heat shrinkable, more preferably biaxially oriented and heat shrinkable. At about 85° C., it preferably has a total free shrink of at least about 5%, more preferably at least about 10%, even more preferably at least about 15%.

The measurement of optical properties of plastic films, including the measurement of total transmission, haze, clarity, and gloss, is discussed in detail in Pike, LeRoy, "Optical Properties of Packaging Materials," *Journal of Plastic Film & Sheeting,* vol. 9, no. 3, pp. 173–80 (July 1993), which is incorporated herein by reference. Specifically, haze is a measurement of the transmitted light scattered more than 2.5° from the axis of the incident light. The haze of a particular film is determined by analyzing it in accordance with 1990 *Annual Book of ASTM Standards,* section 8, vol. 08.01, ASTM D 1003, "Standard Test Method for Haze and Luminous Transmittance of Transparent Plastics", pp. 358–63, which is incorporated herein by reference. Haze results can be obtained using instrumentation such as, for example, an XL 211 HAZEGARD™ system, (Gardner/Neotec Instrument Division; Silver Spring, Md.), which requires a minimum sample size of about 6.5 $cm^2$. A film used according to the present invention preferably has a haze of less than about 20%, more preferably of less than about 15%, even more preferably less than about 10%, still more preferably less than about 7.5%, and most preferably less than about 5%.

A film used according to the present invention can have any intrinsic gloss value (i.e., gloss prior to printing) as long as the film remains suitable for the intended end use application. Typical gloss values of preferred films for use according to the present invention range from about 25 to about 75%. Gloss can be measured according to the procedure described in ASTM D2457, which is incorporated herein by reference.

Useful films can have any total thickness desired as long as they provide the desired properties, e.g. optics, modulus, seal strength, etc., for a given packaging operation. Nevertheless, films to be used according to the present invention preferably have a total thickness of from about 0.0075 to about 0.25 mm, more preferably from about 0.0125 to about 0.125 mm, even more preferably from about 0.025 to about 0.1 mm, and most preferably from about 0.045 to about 0.075 mm.

Packaging films can be and often are irradiated, which involves subjecting a film material to radiation such as high energy electron treatment. This can alter the surface of the film and/or induce crosslinking between molecules of the polymers contained therein. The use of ionizing radiation for crosslinking polymers present in a film structure is disclosed in U.S. Pat. No. 4,064,296 (Bornstein et al.), the teaching of which is incorporated herein by reference.

If desired or necessary to, for example, increase adhesion to an enclosed meat product, all or a portion of a film can be corona and/or plasma treated. These types of oxidative surface treatment involve bringing a film material into the proximity of an $O_2$- or $N_2$-containing gas (e.g., ambient air) which has been ionized. Exemplary techniques are described in, for example, U.S. Pat. No. 4,120,716 (Bonet) and U.S. Pat. No. 4,879,430 (Hoffman), the disclosures of which are incorporated herein by reference.

Some end use applications can call for films with surface energies of at least about 0.034 $J/m^2$, preferably at least about 0.036 $J/m^2$, more preferably at least about 0.038 $J/m^2$, and most preferably at least about 0.040 $J/m^2$. Regardless of whether an oxidative treatment is used to attain such levels, films having them can be preferred for such end use applications.

A film for use in the present invention can be used to package a variety of products, although it preferably can be used to package a food substance, particularly meat products, cheese, and produce. Examples of meat products that can be packaged include, but are not limited to, poultry (e.g., turkey or chicken breast), bologna, braunschweiger, beef, pork, lamb, and whole muscle products such as roast beef. Examples of produce that can be packaged include, but are not limited to, cut and uncut lettuce, carrots, radish, celery, and the like. The packaging of fluids or flowable materials also is a desirable end use.

A bag can be made from a film by sealing to itself the outer layer, whereby that layer becomes the exterior layer of the bag or by clipping at least one end. The bag can be an end-seal bag, a side-seal bag, an L-seal bag (i.e., sealed across the bottom and along one side with an open top), or a pouch (i.e., sealed on three sides with an open top). Additionally, lap seals can be employed. After forming a bag, a product can be introduced into the bag, and the open end of the bag can be sealed.

Alternatively, a film can be wrapped substantially completely around a product and then heat sealed so as to form a package. Where such a bag or package is made from a heat shrinkable film, the film can shrink around the product when it is subjected to heat. Where the product being packaged is a food product, it can be cooked by subjecting the entire bag or package to an elevated temperature for a time sufficient to effectuate the degree of cooking desired.

Regardless of the structure and end use form of the film to be used, it bears printing on at least its outer surface. Packaging films typically are printed by rotary screen, gravure, or flexographic techniques, with flexography being a preferred method. A preferred flexographic arrangement, involving a central impression cylinder surrounded by print stations, is shown and described in U.S. Pat. No. 5,407,708 (Lovin et al.), the teaching of which is incorporated herein by reference.

The inks used in U.S. Pat. No. 5,407,708 are cured or set by means of radiation. Unlike those inks, however, the inks used in the printed film and printing method of the present invention do not require exposure to radiation. Instead, they can be sufficiently affixed prior to application of subsequent ink layers by means of air and/or heat.

The foregoing inks involve pigment(s) dispersed in one or more standard carrier resins. The pigment can be 4B Toner (PR57), 2B Toner (PR48), Lake Red C (PR53), lithol red (PR49), iron oxide (PR101), Permanent Red R (PR4), Permanent Red 2G (PO5), pyrazolone orange (PO13), diaryl yellows (PY12, 13, 14), monoazo yellows (PY3,5,98), phthalocyanine green (PG7), phthalocyanine Blue, β form (PB15), ultramarine (PB62), permanent violet (PV23), titanium dioxide (PW6), carbon black (furnace/channel) (PB7), PMTA pink, green, blue, violet (PR81, PG1, PB1, PV3,), copper ferrocyanide dye complexes (PR169, PG45, PB62, PV27), or the like. (Parenthetical identifications in the foregoing refer to the generic color index prepared by the Society of Dyers and Colourists.) Such pigments and combinations thereof can be used to various colors including, but not limited to, white, black, blue, violet, red, green, yellow, cyan, magenta, or orange.

Examples of typical carrier resins used in standard inks include those which have nitrocellulose, amide, urethane, epoxide, acrylate, and/or ester functionalities. Standard carrier resins include one or more of nitrocellulose, polyamide, polyurethane, ethyl cellulose, cellulose acetate propionate, (meth)acrylates, poly(vinyl butyral), poly(vinyl acetate), poly(vinyl chloride), and the like. Typically, such resins are blended, with widely used blends including nitrocellulose/polyamide and nitrocellulose/polyurethane. The latter blend is preferred in the present invention because it can resist penetration of monomers and/or oligomers existing in the overcoat (discussed below).

Ink resin(s) normally are solvated or dispersed in one or more solvents. Typical solvents employed include, but are not limited to, water, alcohols (e.g., ethanol, 1-propanol, isopropanol, etc.), acetates (e.g., n-propyl acetate), aliphatic hydrocarbons, aromatic hydrocarbons (e.g., toluene), and ketones. Such solvents typically are incorporated in amounts sufficient to provide inks having viscosities, as measured on a #2 Zahn cup as known in the art, of at least about 15 seconds, preferably of at least about 20 seconds, more preferably of at least about 25 seconds, and most preferably of from about 25 to about 35 seconds.

Preferably, each of the inks used to make the printed markings on the film surface are essentially free of photoinitiators, thus eliminating the possibility that such materials can migrate toward and into the product to be packaged. Also, the ink(s) preferably are essentially free of waxes, which can prevent uniform distribution and adhesion of the overcoat (discussed below).

Once a first ink layer is applied to the film, the solvent contained therein is allowed to or caused to evaporate. Where a printing system such as that described in the aforementioned patent is employed, the solvent preferably is caused to evaporate by means of heat or forced air so as to reduce the amount of time prior to the next ink layers are applied. Once the first ink layer is applied, all subsequent ink layers (if any) are applied in a similar, standard manner.

Any number of inks can be used to create the printed image. However, cost and space limitations normally impose some practical limit. For printing systems which employ eight print stations, more than one and up to seven different inks preferably are used to apply pigment-containing markings to the film. The use of up to seven inks allows the eighth print station to be reserved for the pigment-free overcoat material, described infra. Alternatively, all eight print stations can be reserved for inks and a pigment-free overcoat material, described infra, applied downstream thereof (preferably on the same printing system). This can allow for complete air drying of the solvents in the inks prior to sealing with the overcoat material.

Once all the various ink layers have been applied to the film surface, a pigment-free overcoat is applied to substantially all of the film surface which has been printed. This overcoat is that which can provide protection to the printed image during further processing, treatment, and use. This overcoat preferably is essentially transparent so that the underlying printed markings are as clearly visible as possible. Preferably, the overcoat material is essentially free of photoinitiators, which eliminates the possibility that such materials can migrate toward and into the product to be packaged.

The overcoat includes one or more polymers or oligomers, optionally mixed with one or more copolymerizable monomers, which polymerize and/or crosslink upon exposure to ionizing radiation. These materials can be monofunctional or have two or more terminal polymerizable ethylenically unsaturated groups per molecule. Energy polymerizable compounds or precursors include, but are not limited to, reactive vinyl monomers, including esters of (meth)acrylic acid, such as beta-carboxyethyl (meth) acrylate; hexanediol di(meth)acrylate; ethoxylated hexanediol di(meth)acrylate; di-, tri-, and/or poly-propylene glycol diacrylate; isobornyl (meth)acrylate; propoxylated glycerol triacrylate; trimethylolpropane tri(meth)acrylate; ethoxylated trimethylolpropane tri(meth)acrylate; propoxylated trimethylolpropane tri(meth)acrylate; polyether diacrylates; bisphenol A diacrylate; aminoplast (meth)acrylates. Other polymerizable compounds include (meth) acrylamides, vinyl acetate, polythiols, and the like. Oligomers include, but are not limited to, (meth)acrylated epoxides, (meth)acrylated polyesters, (meth)acrylated urethanes/polyurethanes, (meth)acrylated polyethers, and (meth)acrylated acrylic oligomers.

Where oligomer(s) are combined with one or more monomers, the viscosity of the mixture preferably is such that it can be printed/applied in a similar matter as solvent-based inks. Typical concentrations of monomer(s) and reactive oligomer(s) and/or polymer(s) can vary from about 5 to about 95% monomer(s) and from about 95 to about 5% reactive oligomer(s) and/or polymer(s). When copolymerizable components are included in the compositions, the amounts used depend on the total amount of ethylenically unsaturated component(s) present; for example, in the case of polythiols, 1 to 98% of the stoichiometric amount (based on the ethylenically unsaturated component(s)) can be used. (These types of materials typically contain small amounts of polymerization inhibitors, processing aids, and other additives. Such additives themselves preferably are reactive so as to become incorporated into the polymer matrix of the overcoat or are of a high enough molecular weight so that the chance of migration into or toward the film is reduced or eliminated. Preferred materials include those that contain (meth)acrylate functionalities, particularly acrylate functionalities.)

The material(s) from which the overcoat is formed can be applied using the same techniques as described previously with respect to the ink(s). Exemplary techniques include, but are not limited to, screen, gravure, and flexographic techniques. Although application of the overcoat can occur separate in time and/or location from application of the ink(s), it preferably occurs in-line with application of the ink(s).

Regardless of the application technique chosen, the thickness of the resulting overcoat preferably is sufficient to provide good scratch resistance (during film handling and processing) and chemical resistance to, e.g., fatty acids, oils, processing aids, etc., but not so thick as to prevent the overcoat from shrinking or flexing with the film as required by the application(s) to which the film will be put. Generally, useful overcoat thicknesses can range from about 0.5 to about 12 $\mu$m, preferably from about 1 to about 10 $\mu$m, more preferably from about 1.5 to about 8 $\mu$m, and most preferably from about 2 to about 5 $\mu$m.

Once the overcoat is applied, the printed film is exposed to ionizing radiation. This polymerizes and/or crosslinks the materials in the overcoat, thus providing a hardened "shell" over the underlying printed markings. Useful types of ionizing radiation include electron beam (e-beam), X-ray, corona discharge, and the like, with the former being preferred. Regardless of source, the dose of ionizing radiation preferably is sufficiently high to polymerize and crosslink the overcoat sufficiently yet not so high so as to degrade the underlying printed markings or the surface of the film. Generally, useful radiation dosages can range from about 50 to about 250 keV, preferably from about 55 to about 200 keV, and more preferably from about 60 to about 150 keV. (Conventional e-beam irradiation units operate at higher voltages and are believed to produce electrons which pass through the coating without effectively and efficiently curing the total coating. Although not scientifically proven at this time, new low voltage (60–100 keV) e-beam irradiation units such as those commercially available from Applied Advanced Technologies (Winchester, Mass.) are believed to incorporate one or more materials in the window of the unit that allow electrons to pass therethrough at a lower velocity and render a more effective cure to the overcoat surface.)

If the processing techniques employed allow for the use of a low oxygen environment, the coating and irradiation steps preferably occur in such an atmosphere. A standard nitrogen flush can be used to achieve such an atmosphere. The oxygen content of the coating environment preferably is no greater than about 300 ppm, more preferably no greater than about 200 ppm, even more preferably no greater than about 100 ppm, still more preferably no greater than about 50 ppm, and most preferably no greater than about 25 ppm with a completely oxygen-free environment being the ideal.

Regardless of the intrinsic gloss of the film used, the printed film preferably exhibits a gloss of at least about 50%, more preferably at least about 65%, and more preferably at least about 75% subsequent to application and irradiation of the overcoat. Additionally, the gloss level of the overcoat itself preferably is at least about 75%.

The above-described techniques can be used with a variety of packaging materials, including those used for the packaging of beef, pork, poultry, cheese, produce, liquids, pet foods, and the like. A preferred application involves those packaging materials used in conjunction with food products that are processed in thermoplastic film packages by subjecting the packaged product to elevated temperatures (e.g., hot water or steam), i.e., cook-in. Various meat products, such as pork, sausage, poultry, mortadella, bologna, beef, braunschweiger, etc., are prepared as cook-in products; certain non-meat proteinaceous products such as soybean can be processed similarly. In all these cases, obtaining adequate film-to-food adhesion and providing a snug package can be necessary for acceptable aesthetic appearance.

Packaging materials for use in cook-in applications typically are produced in roll form and then, after printing, converted into shirred sticks, bags, pouches, and the like for the end user. Accordingly, a cook-in film must be capable of withstanding exposure to solvents (e.g., mineral oil), mechanical stresses (e.g., bending), high temperatures, high pressure, abrasions, etc., for extended periods of time while not compromising its ability to contain the food product or its flexibility. During a typcial conversion process, about 75 m of film is mechanically compressed into about 0.75 m. Often the process speed, pressure, and mineral oil causes adhesive failure of standard ink systems to the underlying film.

In cook-in applications, the packaging material typically is segmented and filled with a meat product slurry. The package is forced into a stainless steel mold and submerged in a cook tank, normally for a fairly lengthy cook cycle. Submersion in hot (i.e., about 55° to 65° C.) water for up to about 4 hours is common; submersion in 70° to 100° C. water or exposure to steam for up to 12 hours is not uncommon, although most cook-in procedures normally do not involve temperatures in excess of about 90° C. Following the cook-in process, the film or package preferably conforms, if not completely then at least substantially, to the shape of the contained food product.

The printed film of the present invention retains at least about 80%, preferably at least about 85%, more preferably at least about 90%, of its printed markings even after being subjected to elevated temperatures such as, for example, 70° C. for extended periods of time such as, for example, an hour or more.

Objects and advantages of this invention are further illustrated by the following examples. The particular materials and amounts thereof, as well as other conditions and details, recited in these examples should not be used to unduly limit this invention.

EXAMPLES

Various overcoat-forming formulations were evaluated to determine whether they could improve the heat/scratch resistance of a nitrocellulose/polyurethane ink system.

The outer surface of a tubing made from a blend of LLDPE and ethylene/vinyl acetate copolymer tubing was corona discharge-treated to a level of 0.042 $J/m^2$ and then printed on a central impression flexographic printing press with white, red, and blue inks. The tubing then was cut into a number of film segments.

One film, used as a control, was coated over its ink markings with a solvent-based nitrocellulose/polyurethane overcoat. This overcoat was dried by means of hot air.

A series of radiation-curable coating blends were applied to the printed surfaces of other films using a hand proofer having a cell configuration of 360 lines per inch and $6.2 \times 10^9$ $mm^3$ (hereinafter "bcm"). The coating materials used, and the suppliers of each, are given below:

(a) MiraGloss™ 9100 polyacrylate (Morton International; Chicago, Ill.)
(b) PRO1598 acrylated polybutadiene (Sartomer Co, Inc.; Exton, Pa.)
(c) SR415 alkoxy-functionalized triacrylate (Sartomer)
(d) CRODAMER™ 215 polyester acrylate (Croda, Inc.; New York, N.Y.)
(e) TRPGDA-DEO diacrylate (UCB Chemicals Corp.; Smyrna, Ga.)
(f) SARCRYL™ CN 818 acrylate oligomer/monomer mixture (Sartomer)
(g) EBERCRYL™ 350 acrylate-functionalized silicone (UCB)

Four coating blends were prepared from the foregoing materials. The composition of each coating was as follows:

(1) 95% (a), 3.5% (b), 1.5% (c)
(2) 85% (a), 15% (f)
(3) 49.5% (d), 49.5% (e), 1% (g)
(4) 49.5% (e), 49.5% (f), 1% (g)
(5) 24.8 (d), 49.5% (e), 24.7% (f), 1% (g)

The coated films then were loaded onto a tray which was passed under an 80 keV electron beam radiation unit until being exposed to a dose of 3.0 megarads. Prior to use, the radiation unit was purged so that the oxygen concentration of the work zone was about 300 ppm.

Coated samples then were subjected to a free shrink test and a product simulation test. In the former, 3.8 cm×5.1 cm portions of each tubing were placed in 85° C. water for about 5 minutes during which time each film material shrunk about 20% in both width and length. Each sample was removed and cooled to ambient temperature (about 23° C.).

In the latter test, the printed tubings were placed against a stainless steel mold and cooked at a temperature of 85° C. for about 6 hours. During the cooking process, the tubings shrunk and moved across the hot stainless steel surface.

Each test sample, from both tests, was evaluated based on the following rating scale:

| | |
|---|---|
| ++ | : Perfect |
| + | : No loss-maybe a spec loss when held to light. |
| +− | : Small or unobvious loss spots-worth a second chance |
| − | : Significant Loss |
| −− | : Gross Loss |

and these results are summarized in the table that follows.

TABLE 1

Free Shrink and Heat Scratch Tests

| | Free Shrink | Heat Scratch |
|---|---|---|
| Control | ++ | − |
| 1 | + | ++ |
| 2 | ++ | ++ |
| 3 | + | ++ |
| 4 | ++ | ++ |
| 5 | ++ | ++ |

In general, both ink-derived markings and overcoat varnishes fracture and separate from a film when they do not shrink at a rate equal to or greater than that of the film. Solvent-based inks generally shrink at the same rate as heat shrinkable tubing, whereas most radiation curable coatings are crosslinked and tend not to shrink as much. However, the data of Table 1 show that certain radiation curable formulations can provide excellent resistance to scratching and flaking.

Various modifications and alterations that do not depart from the scope and spirit of this invention will become apparent to those skilled in the art. This invention is not to be unduly limited to the illustrative embodiments specifically described.

We claim:

1. A method of forming a packaged food comprising the steps of:

providing a thermoplastic flexible packaging material;

applying one or more layers of solvent-based ink comprising solvent to the packing material, wherein the solvent-based ink is not exposed to ultraviolet or electron beam radiation to accomplish the drying, drying the one or more layers of solvent-based ink by evaporating the solvent to form a pigment-containing marking;

coating a pigment-free coating over the pigment-containing marking, the pigment-free coating comprising one or more radiation-curable materials;

subsequently exposing the pigment-free coating to ionizing radiation to provide a printed packaging material having a cured pigment-free coating and a gloss of at least about 50%; and enclosing a food substance within the flexible thermoplastic packaging material subsequent to the exposing step to produce a packaged food substance.

2. The method of claim 1 further comprising a step of heating the packaged food substance to cook the food substance.

3. The method of claim 2 wherein the heating step includes a heating method selected from the group consisting of submersion in water or exposure to steam.

4. The method of claim 1 wherein said solvent is selected from the group consisting of alcohol, acetate, water and mixtures thereof.

5. The method of claim 1 wherein said cured pigment-free coating is transparent to visible light, whereby the pigment-containing marking is visible under the cured pigment-free coating.

6. The method of claim 1 wherein the packaging material has a surface energy of at least about 0.040 J/$m^2$.

7. The method of claim 1 wherein the solvent-based ink includes a pigment forming a color selected from white, black, blue, violet, red, green, yellow, cyan, magenta, and orange.

8. The method of claim 1 wherein said applying step includes sequentially applying at least two layers of solvent-based ink.

9. The method of claim 1 wherein said packaging material comprises a thermoplastic flexible film.

10. The method of claim 1 wherein said packaging material comprises a thermoplastic film having a total free shrink at 85° C. of at least about 5%.

11. The method of claim 1 wherein said one or more radiation curable materials comprise an acrylate moiety.

12. The method of claim 1 wherein the printed packaging material has a gloss of at least about 65%.

13. The method of claim 1 wherein said pigment-free coating comprises from about 5 to about 95% monomer components.

14. The method of claim 1 wherein said coating coating the pigment-free coating by a method selected from the group consisting of screen, gravure, and flexographic techniques.

15. The method of claim 1 wherein the packing material has two primary surfaces, and said applying step includes applying the one or more layers of solvent-based ink on only one of said primary surfaces.

16. The method of claim 1 wherein said flexible packaging material has a thickness of from about 0.0075 to about 0.125 mm.

17. The method of claim 1 wherein said flexible packaging material has a thickness of from about 0.0125 to about 0.125 mm.

18. The method of claim 1 wherein said flexible packaging material has a thickness of from about 0.025 to about 0.1 mm.

19. The method of claim 1 wherein said cured pigment-free coating has a thickness of from about 0.5 to about 12 μm.

20. The method of claim 1 wherein said cured pigment-free coating has a thickness of from about 1.5 to about 8 μm.

21. The method of claim 1 wherein said packaging material comprises a thermoplastic flexible tube.

22. The method of claim 1 wherein the one or more radiation-curable materials comprise one or more monomers and the one or more layers of solvent-based ink comprise a resin blend capable of resisting the penetration of the one or more monomers.

23. The method of claim 1 wherein said one or more layers of solvent-based ink comprise a urethane resin.

24. The method of claim 1 wherein said one or more layers of solvent-based ink comprise resin selected from the group consisting of nitrocellulose resin, polyurethane resin, mixtures thereof.

25. The method of claim 1 wherein said ionizing radiation comprises an electron beam.

26. The method of claim 1 wherein said ionizing radiation comprises X-ray ionizing radiation.

27. The method of claim 1 wherein said exposing step includes exposing the pigment free coating to a radiation dosage of from about 50 to about 250 keV.

28. The method of claim 1 wherein said exposing step includes exposing the pigment free coating to a radiation dosage of from 60 to 100 keV.

29. The method of claim 1 wherein:

the applying step includes applying the one or more layers of solvent-based ink using a multi-station solvent-based ink print system having multiple stations and a last station located the farthest downstream of the multiple stations; and the coating step includes applying the pigment-free coating using the last station.

30. The method of claim 1 wherein:

the packaging material comprises a multi-layered packaging film having an outer layer comprising a polyamide; and further comprising:

applying at least one layer of the one or more layers of solvent-based ink to the polyamide layer of the packaging film.

31. The method of claim 1 wherein the solvent is selected from the group consisting of alcohol, acetate, and mixtures thereof.

32. The method of claim 1 wherein the gloss of the printed packaging material is at least about 75%.

33. The method of claim 1 wherein the solvent comprises alcohol.

34. The method of claim 1 wherein the solvent comprises acetate.

35. The method of claim 1 wherein the solvent comprises aliphatic hydrocarbon.

36. The method of claim 1 wherein the solvent comprises aromatic hydrocarbon.

37. The method of claim 1 wherein the solvent comprises ketone.

38. The method of claim 1 wherein the printed packaging material retains at least about 80 weight percent of the pigment-containing marking after being submerged in 70° C. water for one hour.

* * * * *

UNITED STATES PATENT AND TRADEMARK OFFICE

CERTIFICATE OF CORRECTION

PATENT NO. : 6,528,127 B1
DATED : March 4, 2003
INVENTOR(S) : Edlein et al.

It is certified that error appears in the above-identified patent and that said Letters Patent is hereby corrected as shown below:

Column 14,
Line 40, "packing" should be -- packaging --.
Lines 40-42, ",wherein the solvent-based ink is not exposed to ultraviolet or electron beam radiation to accomplish the drying," should be -- ; --
Line 43, insert after the word "marking" -- , wherin the solvent-based ink is not exposed to ultraviolet or electron beam radiation to accomplish the drying; --

Column 15,
Line 22, after the first occurrence of "coating" insert -- step includes --.
Line 26, "packing" should be -- packaging --.

Column 16,
Line 3, after the word "resin," insert -- and --.

Signed and Sealed this

Sixth Day of July, 2004

JON W. DUDAS
*Acting Director of the United States Patent and Trademark Office*